Patented Oct. 12, 1937

2,095,320

UNITED STATES PATENT OFFICE 2,095,320

MANUFACTURE OF CYCLIC DIETHERS

Henry Dreyfus, London, England

No Drawing. Application November 23, 1932, Serial No. 644,082. In Great Britain November 30, 1931

2 Claims. (Cl. 260—54)

This invention relates to the manufacture of cyclic diethers.

Compounds containing the carbonyl group, such as aldehydes and ketones, react with polyhydric alcohols to produce cyclic dioxides. For instance, as is described in my U. S. Application S. No. 644,081 filed November 23, 1932, formaldehyde reacts with ethylene glycol to produce ethylene methylene dioxide and with higher glycols to produce the corresponding diethers of the higher glycols, and higher aldehydes, e. g. acetaldehyde, react with the glycols to produce higher alkylidene diethers, e. g. ethylidene diethers, of the glycols.

According to the present invention the etherification of compounds containing the carbonyl group, and in particular aldehydes, with aldehydes, glycols or other polyhydric alcohols is effected, in an especially satisfactory manner, by carrying out the reaction in presence of restricted quantities of water, and particularly in presence of about one molecule of water to each molecule of the aldehyde or other body containing the carbonyl group. More particularly, aldehydes are etherified whilst in the form of highly concentrated aqueous solutions and preferably in the form of solutions containing not substantially more water than would be necessary to produce the hypothetical glycol by assumed reaction between the water and the aldehyde.

The etherification may be effected by means, or with the aid of, catalysts capable of promoting etherification reactions, e. g. sulphuric acid, hydrochloric acid, ferric chloride, zinc chloride, phosphoric acid, benzene sulphonic acid, acid salts such as alkali or other bisulphates or acid phosphates. Such catalysts need not usually be employed in a greater concentration than 50% and it is preferable to employ them in not more than 46% concentration. The use of concentrations of between 8 and 15% is particularly advantageous.

The etherification of aldehydes with glycols or other polyhydric alcohols may be effected simply by heating a mixture of the aldehyde, glycol and catalyst containing the desired quantity of water which may be introduced by employing an aqueous solution of the aldehyde. When an aqueous solution of the aldehyde is employed it is preferable, as above indicated, that the solution should contain not substantially more water than is necessary to produce the hypothetical glycol by assumed reaction with the aldehyde. The aldehyde need not however be employed in the form of an aqueous solution and may, for instance, be supplied in vapour form in admixture with steam to a reaction liquor comprising the glycol and catalyst maintained at the desired temperature until all or the desired quantity of the glycol has been reacted upon. Alternatively, the aldehyde supplied to the reaction zone may, if desired, contain only part or none at all of the necessary water which may be present in admixture with the glycol. Further, the aldehyde whether in admixture with water or not, may be employed in the form of a polymer, for instance a mixture of trioxy-methylene, ethylene glycol, water and catalyst may be heated to produce ethylene methylene dioxide.

When the glycols or other polyhydric alcohols are to be etherified with ketones, the water may likewise be introduced by any of the methods above indicated or in any other convenient manner.

When aldehydes are employed in the form of aqueous solutions the concentration thereof may vary considerably with the aldehyde to be employed. Thus, with formaldehyde solutions, concentrations of over 45% formaldehyde may be employed; very highly concentrated or saturated solutions, such as of about 48% to 52% formaldehyde, are especially advantageous. Acetaldehyde solutions of between about 60% and 75% strength may advantageously be employed, whilst propionaldehyde solutions of between about 70% and 85% may advantageously be employed.

The production of the ethers is usually best carried out at temperatures of between about 100 and 160° C. in the case of aldehyde with aldehyde etherification and 130 and 180° C. in the case of aldehyde with glycol etherification. When the reactions are carried out at these temperatures and in the liquid phase the presence of the water may be maintained in any convenient manner, e. g. by the use of increased pressure.

The following example illustrates the production of ethylene methylene oxide in accordance with the present invention, but it is to be understood that this example is given merely by way of illustration and is in no way limitative.

Example

Equimolecular proportions of formaldehyde (in the form of a 50% aqueous solution) and ethylene glycol are mixed and introduced together with 12 parts of sulphuric acid per 100 parts of glycol into a pressure resisting reaction vessel.

The reaction vessel is closed and heated to a temperature of about 140° C. for 4–5 hours.

After cooling, the reaction vessel is opened, unchanged aldehyde is removed from the reaction products by treatment with sodium hydrogen sulphite, sodium chloride is added to separate the water present as a lower layer and the upper layer, after being treated with sodium carbonate to remove acidity and dried by means of calcium chloride, is distilled to separate the ethylene methylene dioxide produced.

What I claim and desire to secure by Letters Patent is:—

1. Process for the manufacture of ethylene methylene dioxide, which comprises subjecting formaldehyde to reaction with ethylene glycol in presence of water in amount equal to about 1 molecule per molecule of said formaldehyde.

2. Process for the manufacture of cyclic diethers, which comprises subjecting a lower aldehyde of the fatty acid series to reaction with a glycol in the presence of water in amount equal to about one molecule for each molecule of the aldehyde.

HENRY DREYFUS.